US009898205B1

(12) United States Patent
Kaliannan

(10) Patent No.: US 9,898,205 B1
(45) Date of Patent: Feb. 20, 2018

(54) SCHEDULING OF COMMANDS IN A STORAGE AREA NETWORK TO MINIMIZE LATENCY

(71) Applicant: Veritas Technologies LLC, Mountain View, CA (US)

(72) Inventor: Kirubakaran Kaliannan, Beaverton, OR (US)

(73) Assignee: Veritas Technologies LLC, Mountain View, CA (US)

( * ) Notice: Subject to any disclaimer, the term of this patent is extended or adjusted under 35 U.S.C. 154(b) by 162 days.

(21) Appl. No.: 14/068,987

(22) Filed: Oct. 31, 2013

(51) Int. Cl.
G06F 3/06 (2006.01)
H04L 12/801 (2013.01)

(52) U.S. Cl.
CPC ............ *G06F 3/0611* (2013.01); *G06F 3/067* (2013.01); *G06F 3/0635* (2013.01); *G06F 3/0659* (2013.01); *G06F 3/0613* (2013.01); *H04L 47/10* (2013.01)

(58) Field of Classification Search
CPC ....... G06F 3/0635; G06F 3/0613; H04L 47/10
USPC .......................................................... 710/38
See application file for complete search history.

(56) References Cited

U.S. PATENT DOCUMENTS

| 5,937,428 | A | * | 8/1999 | Jantz | 711/114 |
| 8,549,223 | B1 | | 10/2013 | Kaliannan et al. | 711/114 |
| 2005/0283552 | A1 | * | 12/2005 | Kobashi et al. | 710/114 |
| 2007/0028014 | A1 | * | 2/2007 | Hayashi et al. | 710/38 |
| 2007/0162656 | A1 | * | 7/2007 | Bryan et al. | 710/38 |
| 2009/0031057 | A1 | * | 1/2009 | Ghosalkar et al. | 710/38 |
| 2013/0138862 | A1 | * | 5/2013 | Motwani et al. | 711/5 |

* cited by examiner

*Primary Examiner* — Ernest Unelus
(74) *Attorney, Agent, or Firm* — Campbell Stephenson LLP

(57) ABSTRACT

Various systems and methods for scheduling commands of a storage area network to minimize latency are disclosed. For example, one method involves receiving a command, where the command is received prior to this command being issued to one or more storage devices. The commands is configured to be issued to the one or more storage devices using one or more paths. The method also involves determining whether the command is a high impact (HI) command, where this determination is based, at least in part, on one or more criteria. In response to a determination that the command is an HI command, the method involves selecting a first path of the one or more paths as a primary HI path, where the selecting is based on one or more other criteria. The availability of the primary HI path to non-HI commands is determined based on one or more different criteria.

23 Claims, 10 Drawing Sheets

300

Storage Device 302(1)

| Block 1 304(1) | Block 4 304(2) | Block 7 304(3) | Block 10 304(4) | Block 13 304(5) | ● ● ● | Block (N-2) 304(M) |

Storage Device 302(2)

| Block 2 306(1) | Block 5 306(2) | Block 8 306(3) | Block 11 306(4) | Block 14 306(5) | ● ● ● | Block (N-1) 306(O) |

Storage Device 302(3)

| Block 3 308(1) | Block 6 308(2) | Block 9 308(3) | Block 12 308(4) | Block 15 308(5) | ● ● ● | Block N 308(P) |

SCHEDULING OF COMMANDS IN A STORAGE AREA NETWORK TO MINIMIZE LATENCY

BACKGROUND OF THE INVENTION

Field of the Invention

This application relates to distributed storage systems. Particularly, this application relates to scheduling commands of a storage area network to minimize latency.

Description of the Related Art

As businesses increasingly rely on computers for their daily operations, managing the vast amount of business information generated and processed has become a significant challenge. Most large businesses have a wide variety of application programs managing large volumes of data stored on many different types of storage devices across various types of networks and operating system platforms. These storage devices can include tapes, disks, optical disks, and other types of storage devices and often include a variety of products that can be produced by different vendors. Storage area networks (SANs) including hundreds of storage devices can be used to provide storage for hosts.

SANs offer a variety of topologies and capabilities for interconnecting storage devices, subsystems, and server systems. A variety of interconnect entities, such as switches, hubs, and bridges, can be used to interconnect these components. These varying topologies and capabilities allow storage area networks to be designed and implemented that range from simple to complex configurations. Accompanying this flexibility, however, is the complexity of managing a very large number of storage devices and allocating storage for numerous application programs sharing these storage devices. Commands issued to the storage devices can also introduce undesired latencies in the overall data communications conducted, including latencies in data access by such application programs.

BRIEF DESCRIPTION OF THE DRAWINGS

The embodiments of the present application may be better understood, and its numerous objects, features, and advantages made apparent to those skilled in the art by referencing the accompanying drawings.

FIG. 3 is a block diagram illustrating example data stored by storage devices of a storage subsystem, according to one embodiment.

Figure 1:
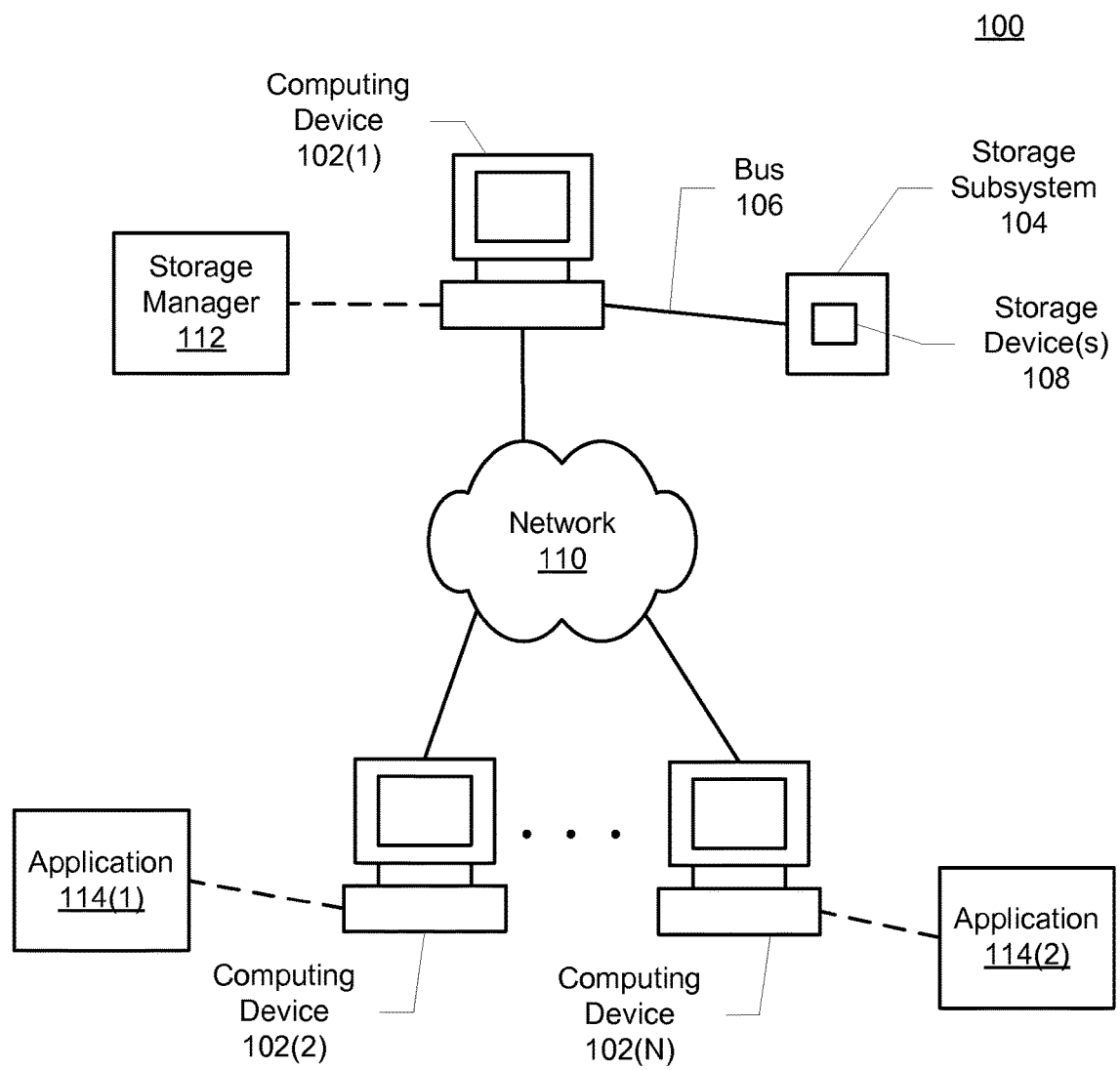
FIG. 1 is a block diagram illustrating a distributed storage system, according to one embodiment.

While the embodiments of the application are susceptible to various modifications and alternative forms, specific embodiments are provided as examples in the drawings and detailed description. It should be understood that the drawings and detailed description are not intended to limit the embodiments to the particular form disclosed. Instead, the intention is to cover all modifications, equivalents and alternatives falling within the spirit and scope of the invention as defined by the appended claims.

DETAILED DESCRIPTION

Embodiments of the present application are directed to scheduling commands of a storage area network to minimize latency in giving effect to those commands and, if such is the case, returning information requested thereby (e.g., data, status, or other such information). For example, one such method involves receiving a command, where the command is received prior to the command being issued to one or more storage devices. The command is configured to be issued to the one or more storage devices using one or more paths. The method also involves determining whether the command is a high impact (HI) command, where this determination is based, at least in part, on one or more criteria. In response to a determination that the command is an HI command, the method involves selecting a first path of the one or more paths as a primary HI path, where the selecting is based on one or more other criteria. The availability of the primary HI path to non-HI commands is determined based on one or more different criteria.

The embodiments of the present application can be implemented using a distributed storage system, such as that shown in FIG. 1. FIG. 1 illustrates a block diagram of a distributed storage system 100, according to some embodiments. Distributed storage system 100 includes computing devices 102(1)-102(3) that are communicatively coupled together using a network 104. Computing device is also coupled to a storage subsystem 106 using a bus 108. Storage subsystem 106 includes one or more storage devices 110.

Computing device 102(1) includes a storage manager 112, which can coordinate scheduling of commands of a storage area network to minimize latency. Computing device 102(1) is communicatively coupled to storage subsystem 104 using bus 106. Storage manager 112 can manage communication of data and/or commands to storage device 104 over bus 106. Each of computing devices 102 can be implemented using a personal computer, a mobile phone, a smart phone, a network device, a tablet, a stand-alone server, and/or as a virtual machine, among other such devices.

Figure 2:
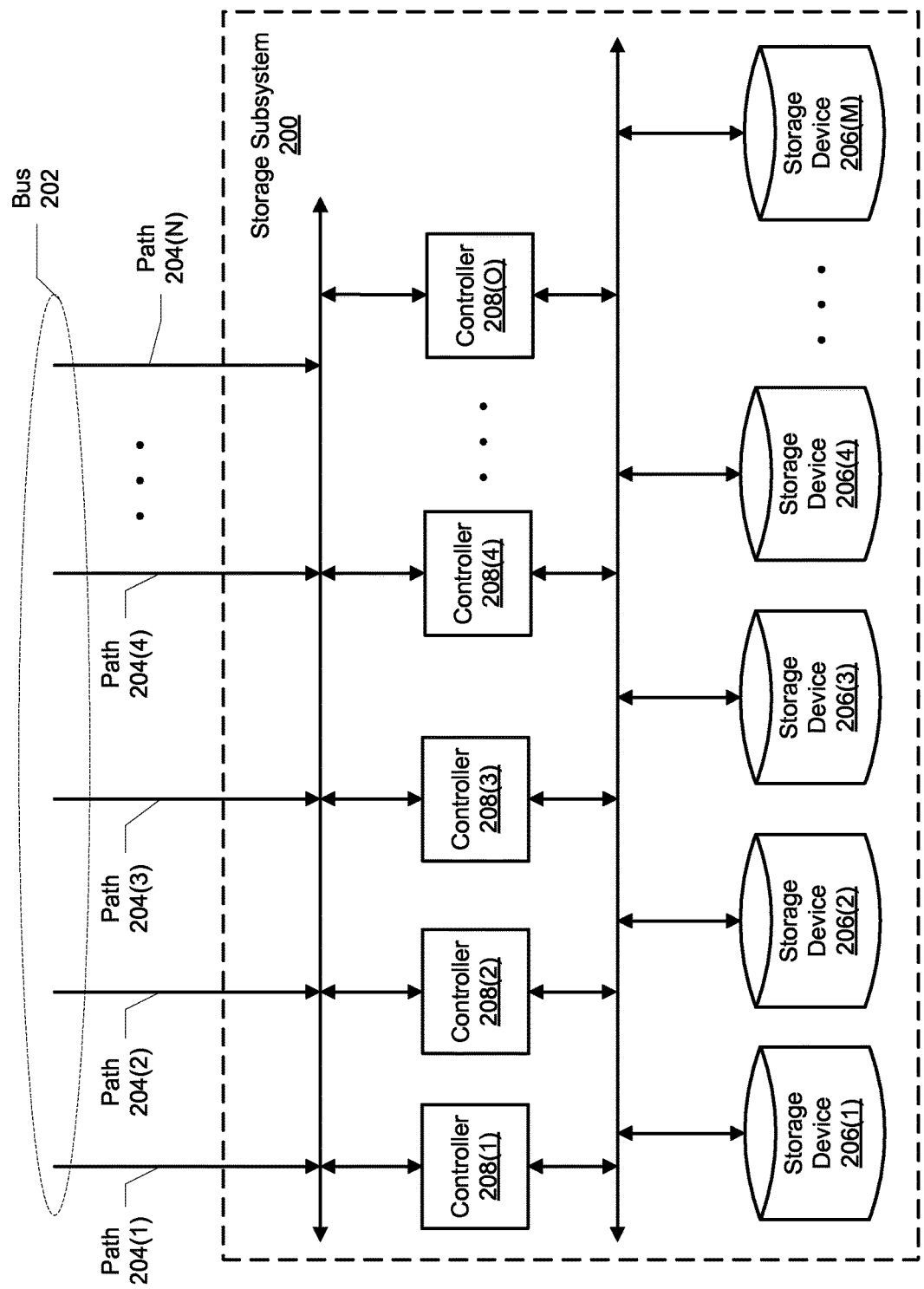
FIG. 2 is a block diagram illustrating a storage subsystem of a distributed storage system, according to one embodiment.

Bus 106 is implemented using a network, such as a storage area network (SAN) and/or a network-attached storage (NAS). For the ease of explanation, the description herein is described using SANs, although the use of NAS-specific devices is contemplated. A SAN provides access to one or more storage subsystems, such as by providing block level operations and/or file-level operations to data stored using the storage subsystem(s). The SAN can be implemented using a SMALL COMPUTER SYSTEM INTER- FACE (SCSI), FIBRE CHANNEL (FC), ATA over ETHERNET (AoE), and/or variants thereof. Depending on the implementation, the SAN allows various commands to be sent between storage manager 112 and storage device(s) 110. Furthermore, bus 106 can be implemented using one or more paths (such as illustrated by FIG. 2). It is noted that in one embodiment, once a path is selected by storage manager 112 (and this path selection communicated to applications 114), this path can be used directly by applications 114 for issuing commands to storage subsystem 104.

For example, if bus 106 is implemented using an SCSI SAN, then various SCSI commands can be sent from storage manager 112 to storage device(s) 110. The SCSI commands can include data read and data write commands (referred to as Input/Output commands (I/O commands)) and what are referred to herein as high impact commands (HI commands). HI commands can include a reclaim command, a writesame command, a trim command, a map command, and/or an unmap command, among others. The HI commands can be issued, for example, by storage manager 112.

As can be appreciated, the HI commands are characterized by a high use of path bandwidth. When an HI command is being issued to the storage subsystem, the path(s) used by the HI command are typically not available for use by I/O commands. For example, in some implementations, a storage subsystem stores data by stripping the data across two or more storage devices (such as described below with reference to FIGS. 3 and 6). A reclaim command (or another HI command) that is issued to a this storage subsystem can use multiple paths (e.g., three out of four available paths) in parallel, thus making these paths unavailable to I/O commands (which would only have one path available in this example). Furthermore, such a reclaim command (or another HI command) can transfer a large amount of data, which can result in these paths being unavailable for I/O commands for some time.

The I/O commands can be issued by storage manager 112 and/or applications 114 that execute on one or more of computing devices 102. For example, storage manager 112 can indicate to applications 114 which path(s) to use for the I/O commands. It is noted that the paths can be also referred to as ports. In one embodiment, storage manager 112 determine which path(s) to use by the HI commands, and which path(s) to use by I/O commands. Storage manager 112 can perform such path determination as described below, including by FIGS. 4-5B.

It is noted that some of computing devices can be implemented using multiple clusters. Each such cluster (which includes one or more computing devices that use a common subset of storage devices and/or common applications) can issue I/O commands and also HI commands to storage manager 112. Although each such cluster typically issues distinct I/O commands from another cluster, the HI commands issued by two separate clusters may be substantially similar, i.e., be directed to the same HI command, but originate from a different cluster (e.g., a different application and/or system administrator for each respective cluster). In situations where the received HI commands are substantially similar to each other, storage manager 112 can check the path status (i.e., markings) to select the same path(s) for the substantially similar HI commands. In one embodiment, depending on the type of the HI command, only one of the substantially similar HI commands is used, and the same result (of the execution of the HI command) is used for the substantially similar HI commands.

Storage subsystem 104 includes one or more storage devices, such as storage device(s) 108. Storage device(s) 108 can be accessed as direct-attached storage (DAS) and/or as virtual hard drives (e.g., via Logical Unit Numbers (LUNs)). Storage device(s) 108 are accessed by storage manager 112 and/or applications 114 using one or more paths, such as described below with reference to FIG. 2. Examples of storage subsystem 104 are described below with reference to FIGS. 2 and 3, although other implementations can be used instead.

FIG. 2 is a block diagram of a storage subsystem of a distributed storage system, according to some embodiments. Storage subsystem 200 is coupled to one or more computing devices (such as computing devices 102) using bus 202. Bus 202 includes one or more paths (also referred to as ports) 208(1)-208(N). For example, if bus 202 is implemented using SCSI, then each of paths 208 can correspond to an SCSI port. Storage subsystem 200 includes one or more storage devices 206(1)-206(M). Each storage device 206 can be implemented using one or more physical hard drives and/or other memory storage device, such as flash memory, tape, optical storage device, and/or other storage media.

Storage devices 206 are controlled using one or more controller(s) 208(1)-208(O). Each of controllers 208 can include one or more processors, memory, and a controller module (not shown). The controller module (which can be stored by controller's memory) can be executed by the controller's processor(s) to receive and execute commands as transmitted by the computing devices. For example, if bus 202 is implemented using SCSI, then controllers 208 can receive SCSI commands (e.g., I/O commands and/or HI commands) via paths 204. Controllers 208 can then execute the received SCSI command(s), such as to access storage devices 206, or to perform HI operations (such as a reclaim operation).

In one implementation, each of paths 204 is serviced (i.e., data and commands are received and processed, and any results are transmitted) by one of controllers 208. For example, controller 208(1) services path 204(1), controller 208(2) services path 204(2), and so forth. However, in other implementations, each of controllers 208 can service one or more of paths 204, such as where two controllers (e.g., 208(1) and 208(2)) both service paths 204(1) and 204(2). In yet another implementation, multiple storage devices (e.g., 206(1)-206(M) are all controlled by one controller (e.g., 208(1)).

In one implementation, each of controllers 208 is associated with one of storage devices 206. For example, controller 208(1) writes data to and reads data from storage device 206(1); controller 208(2) writes data to and reads data from storage device 206(2), and so forth. However, in other implementations, each of controllers 208 can be associated with multiple storage devices 206, such as where two controllers (e.g., 208(1) and 208(2)) are both associated with storage devices 206(1) and 206(2).

FIG. 3 is a block diagram illustrating example data as stored by storage devices of a storage subsystem 300, according to one embodiment. Storage subsystem 300 includes storage devices 302(1)-302(3). Storage subsystem 300 can implement storage subsystem 200 of FIG. 2, where storage devices 302(1)-302(3) correspond to storage devices 206(1)-206(3). As shown, storage devices 302 implement a RAID 3 and/or 5 storage technology, where the stored data is striped across two or more storage devices. In some implementations, a parity storage device (not shown) can also be used for validation, fault tolerance, and/or error checking. It is noted that the RAID system shown in FIG. 3 is presented for explanation purposes only, and other storage paradigms can be used instead.

In the example of FIG. 3, data is stored using a striping technique (this storing process also referred to as data being striped) across three storage devices 302(1)-302(3). Storage device 302(1) stores data blocks 304(1)-304(M), storage device 302(2) stores data blocks 306(1)-306(O), and storage device 302(3) stores data blocks 308(1)-308(P). When data is striped, each consecutive data block can be stored using a next storage device. Thus, as shown by FIG. 3, block 1 is stored using data block 304(1), block 2 is stored using data block 306(1), and block 3 is stored using data block 307(1). The next data block (data block 4) is stored using data block 304(2) (i.e., using storage device 302(1) again, and the striping of data blocks across these three storage devices can continue as shown.

I/O commands are issued by applications, such as to read and write data from/to storage subsystem 300. An I/O read command executed against storage subsystem 300 is configured to read data blocks as striped (or as stored using another technique implemented by storage subsystem 300) across storage devices 302. Similarly, an I/O write command executed against storage subsystem 300 is configured to write data blocks using the striping technique (or another technique that is implemented by storage subsystem 300) across storage devices 302. An HI command, such as a reclaim command, executed against storage subsystem 300 is configured to reclaim multiple data blocks across some or all of storage devices 302.

As a result, such HI commands can slow down, or increase a latency of, execution of I/O commands. This increased latency can unfavorably affect the performance of the applications. This latency can be caused by the paths being used for communication of HI commands, and/or by the storage subsystem's controllers being busy servicing such HI commands, and thus not being available for I/O commands issued by the applications. The methods, including the method of FIG. 4, described herein determine which paths (of the storage subsystem) to use in order to minimize, or substantially eliminate, this latency.

Figure 4:
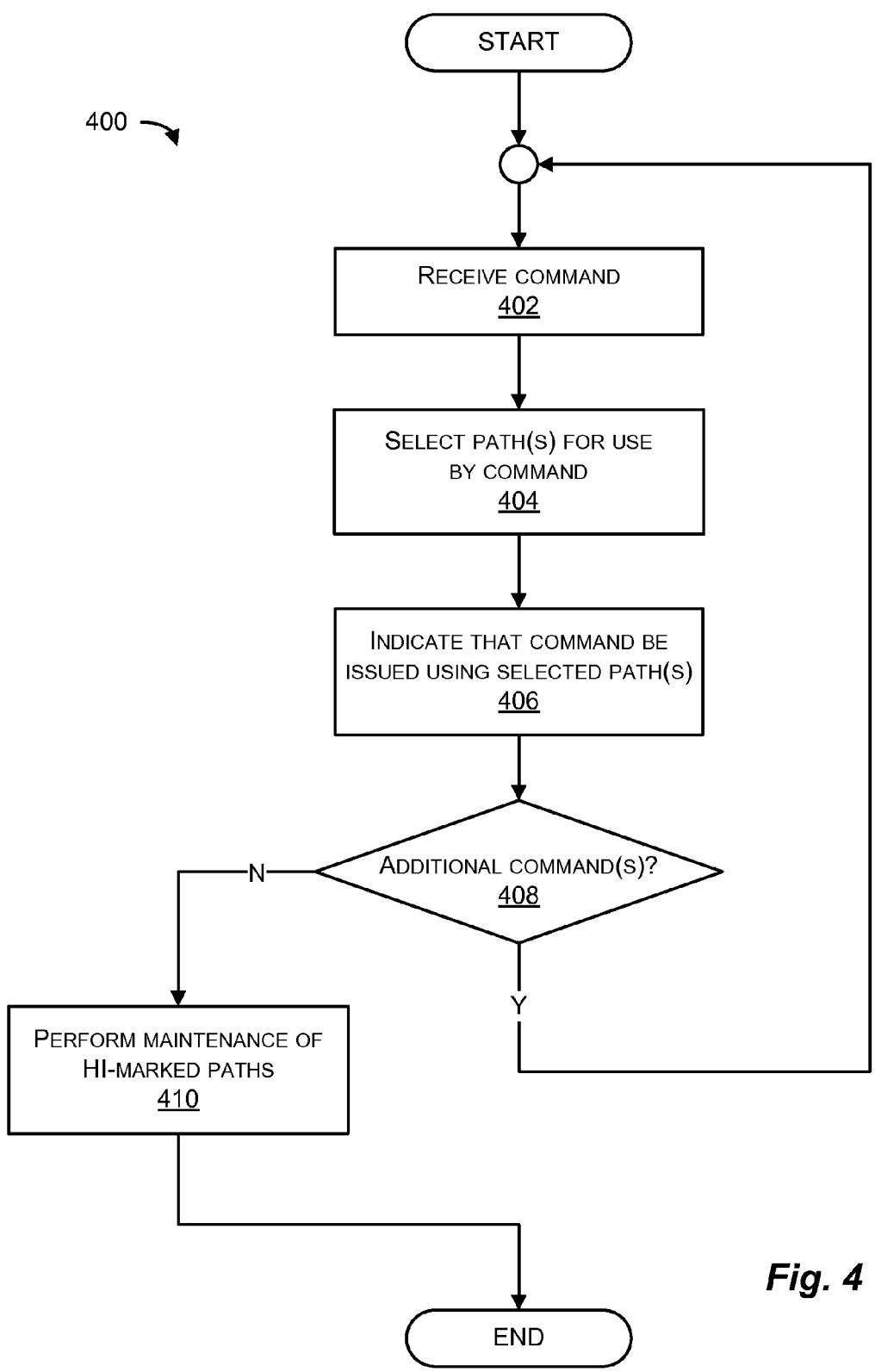
FIG. 4 is a flowchart of a method illustrating the scheduling of commands in a storage area network (SAN) to minimize latency, according to some embodiments.
Figure 5A:
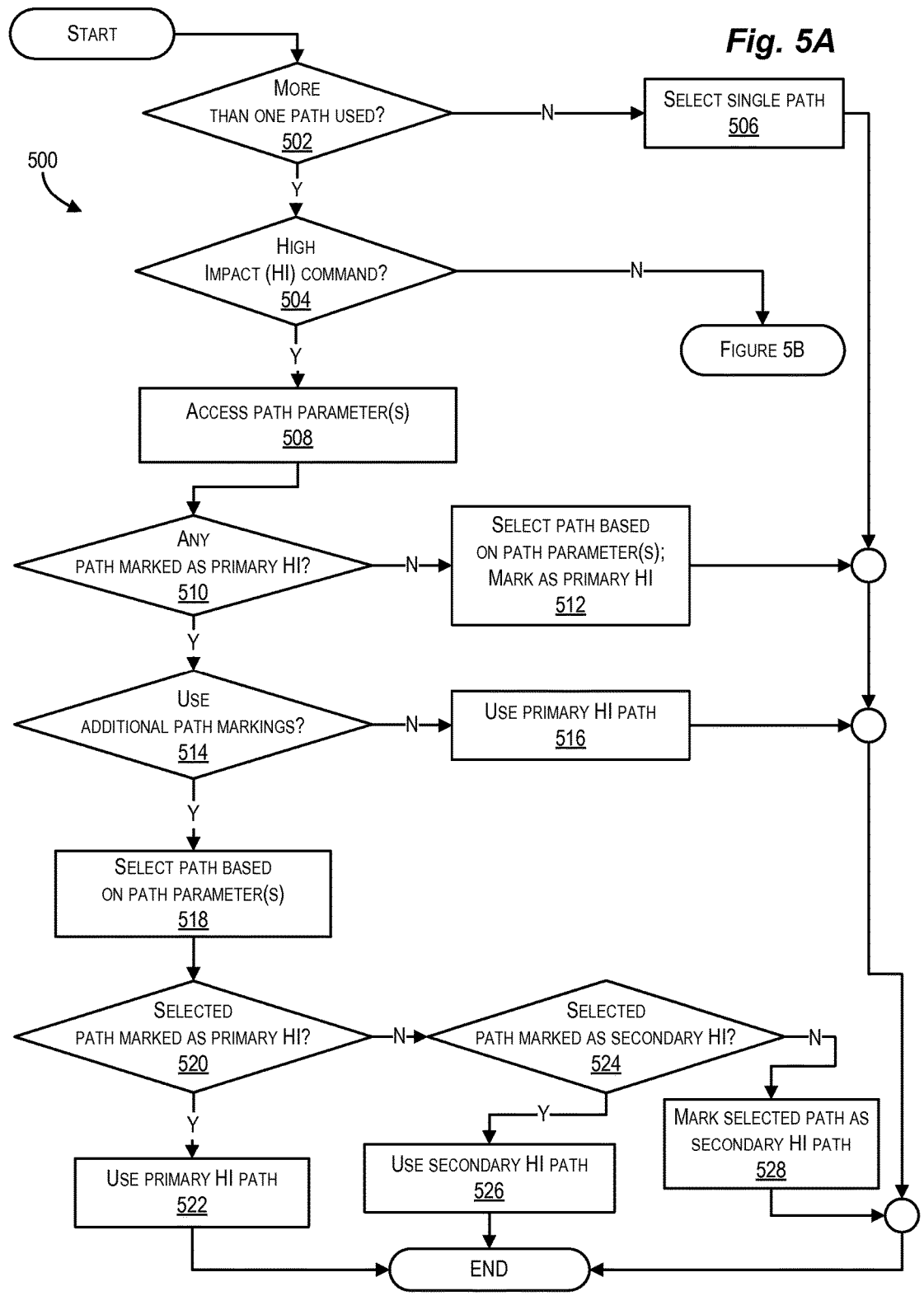
FIGS. 5A and 5B are flowcharts of methods illustrating path selection when scheduling commands in a SAN, according to some embodiments.
Figure 5B:
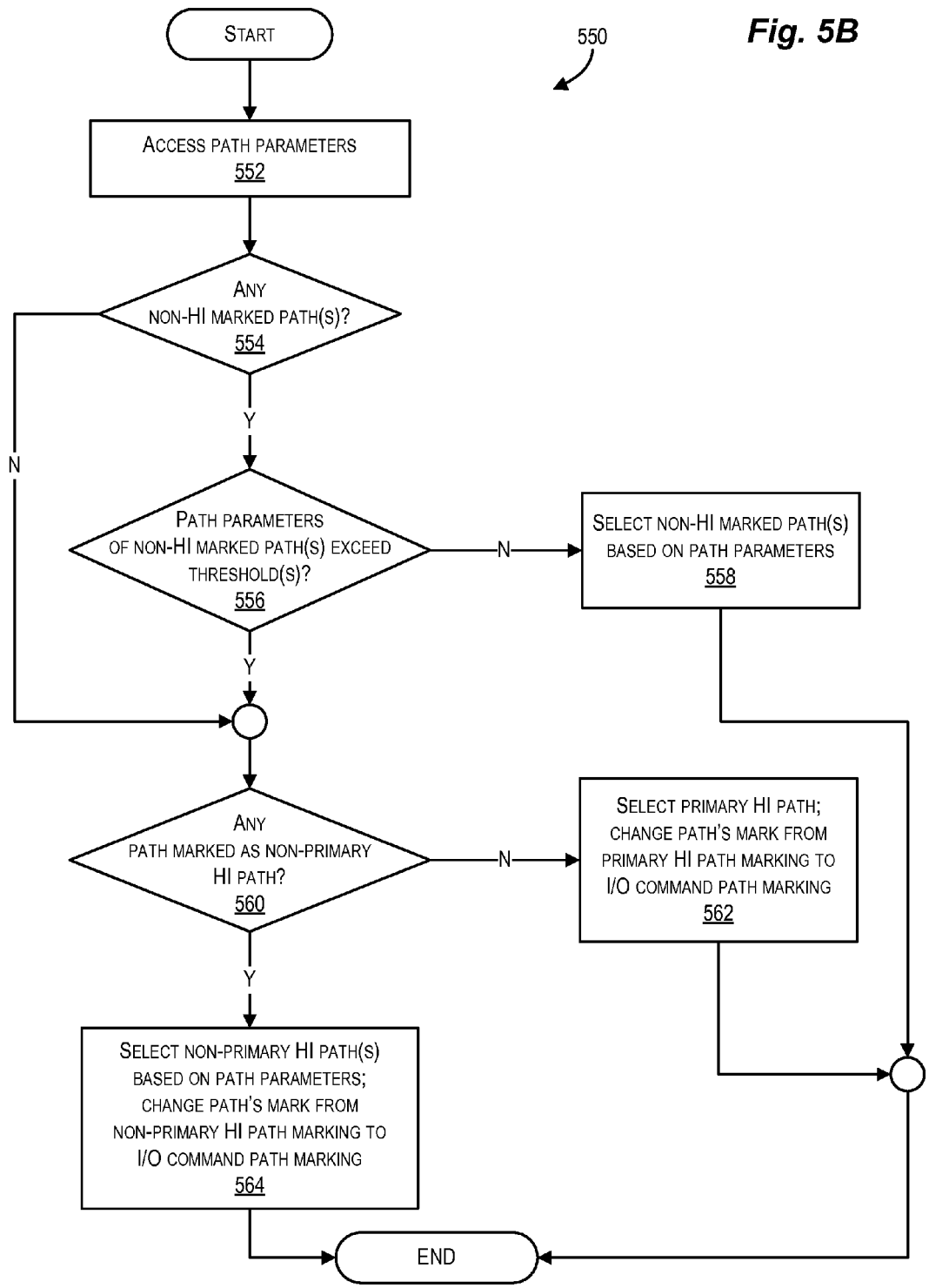

FIGS. 4-5B are flowcharts illustrating methods for the scheduling of commands in a storage area network (SAN), such as to minimize latency, according to some embodiments. As will be appreciated in light of the present disclosure, these methods may be modified in order to derive alternative embodiments. Also, the operations are shown in sequential order. However, certain operations may occur in a different order than shown, certain operations may be performed concurrently, certain operations may be combined with other operations, and certain operations may be absent in another embodiment. Methods of FIGS. 4-5B are described with reference to variations of the elements described in connection with FIGS. 1-3.

FIG. 4 is a flowchart illustrating a method 400 for the scheduling of commands in a storage area network (SAN), such as to minimize latency, according to some embodiments. In one embodiment, method 400 is executed by a storage manager, such as storage manager 112.

In element 402, the storage manager receives a command from an application or a system administrator. The application can generate an I/O command, such as to read data stored by a storage subsystem, or to write data to the storage subsystem. A system administrator (e.g., a software module that controls operation of the distributed storage system) can generate an HI command, such as to reclaim a portion of the data blocks used by the storage subsystem. In one implementation, the system administrator can comprise the storage manager. In one embodiment, the storage manager receives an indication of a command that is to be issued (such as by the application or the system administrator, for the purpose of determining what path that application or system administrator should use to issue the command).

In element 404, the storage manager selects one or more paths to use by the command. The storage manager can select, for example, a path to be used exclusively for HI commands. The storage manager can also select another path that is to be used primarily for HI commands, but with a possibility to be used for non-HI commands. The storage manager can mark each path as primary HI path, a secondary HI path, and/or an I/O command path. Some embodiments of such path selections are described below with reference to FIGS. 5A and 5B.

The storage manager determines which path(s) to use for the command based on the command type (e.g., whether the command is an I/O command or an HI command), on a number of commands that are queued up at each path (such as selecting a path that has a lowest number of queued commands), and/or other factors (referred to herein as path parameters, such as free space available on each storage device that is accessible by a given path, any latency associated with communication over each path, among others). In one embodiment, the storage manager can elect to use more than one path for each command (e.g., by splitting up the functionality of that command over each path). For example, an I/O write command can be transmitted over three separate paths (such as by writing a different portion of the data using each path). In one embodiment, the storage manager stores the received command using a queue that is associated with the selected path.

In element 406, the storage manager indicates that the command can be issued using the selected path(s). In one implementation, the storage manager issues the command (thus indicate internally that the command is to be issued). In another implementation, the storage manager indicates to the application and/or the system administrator (e.g., that in step 402 indicated to the storage manager a command) that the command can be issued using the selected path(s). In response to receiving this indication, the application or to the system administrator then issued the command using the selected path(s).

In element 408, the storage manager determines whether there are additional commands. If there are additional commands, element 402 is performed again. Otherwise, element 410 is performed.

In element 410, the storage manager performs maintenance of paths that are indicated as primary HI paths and/or secondary HI paths. The storage manager can also indicate that certain paths are no longer reserved for HI command use. For example, if no HI commands have been issued in a certain amount of time (e.g., a time period that can be dynamically determined by the storage manager) and a certain path marked as a secondary HI path has zero HI commands in its path queue, then that secondary HI path can be marked (e.g., by removing the secondary HI marking) as being available for I/O commands. In one embodiment, once all secondary HI paths are marked as being available for I/O commands, if no HI commands have been issued in a certain amount of time (e.g., another time period that can be dynamically determined by the storage manager) and a certain path marked as a primary HI path has zero HI commands in its path queue, then this primary HI path can be marked as being available for I/O commands (e.g., by removing the primary HI marking).

FIG. 5A is a flowchart illustrating a method 500 for the selection of paths when scheduling commands in a storage area network (SAN), according to some embodiments. In one embodiment, method 500 is executed by a storage manager, such as storage manager 112. Method 500 can implement element 404 of method 400.

In element 502, the storage manager determines whether more than one path is used. With reference to FIG. 2, the storage manager can determine whether more than one of paths 204 is used. If only one path is used (e.g., only path 204(1), which can arise in certain situations where only one path is available for use by any commands), the storage manager selects that single path (element 506). If more than one path is used, the storage manager performs element 504.

In element 504, the storage manager determines whether the command (i.e., the received command in element 402) is a high impact command (an HI command). This determination be also referred to as being based on a command type criteria. The types of commands that are considered to be high impact can depend on the type of SAN used. If an SCSI SAN is used, then the HI commands (referred to, for the SCSI implementation, as high Impact SCSI commands (HISCs)) can include a reclaim command, a writesame command, a trim command, a map command, and/or an unmap command, among others. If the command is not an HI command, the storage manager performs the method of FIG. 5B. Otherwise, element 508 is performed.

In element 508, the storage manager accesses one or more path parameters. The parameters can include a queue count of each path. The queue count indicates how many commands are waiting to be issued on a given path (one example of using such queues is described below with reference to FIG. 6). In some embodiments, the path parameters can include additional and/or different parameters, such as free space available on each storage device that is accessible by a given path, any latency associated with communication over each path, among others.

In element 510, the storage manager determines whether any paths are marked as a primary HI path. The path can be marked as a primary HI path in a variety of ways, such as by using metadata that is associated with each such path, by associating one or more flags with each path, by using a data structure (e.g., a table) that lists each path and its associated command type, and/or by using other techniques. Regardless of the implementation, if the storage manager determines that there is not a path that is marked as a primary HI path, element 512 is performed. Otherwise, element 514 is performed.

In element 512, the storage manager selects a path based on one or more path parameters. For example, the storage manager can select a path that has a shortest path queue. In other implementations, other path parameters can be used. For example, the storage manager can use a weighting algorithm, where the queue count (i.e., of commands in a path queue) is given 50% of a total score, and other parameters (such as the actual path latency or a percentage of free space of a storage device associated with that path) are each given the remainder (however, it is noted that these percentages are given for explanation purposes only, and the storage manager can auto-adjust these percentages dynamically for each path and/or command). The path with the highest path score can then be selected. Once the path is selected, the storage manager also marks this path as a primary HI path. The determination of element 512 is also referred to as being based on a primary path criteria.

In element 514, the storage manager determines whether paths can be associated with additional marking(s) beside a primary HI path. The additional markings can include secondary HI paths. It is noted that additional HI levels can be implemented, such as a tertiary HI path, etc. If additional markings can be used, element 518 is performed. Otherwise, element 516 is performed.

In element 516, the storage manager selects the path is marked as a primary HI path. In element 518, the storage manager selects a path based on the path parameter(s). This selection can be similar to that of element 512. The storage manager can select a path that has a shortest path queue (i.e., regardless of whether some path is already marked as a primary HI path). In other implementations, other path parameters can be used, such as by using the aforementioned weighting algorithm, where a path with a highest path score is selected.

In element 520, the storage manager determines whether the selected path (i.e., as selected in element 518) is marked as a primary HI path. If the selected path is marked as a primary HI path, then the primary HI path is used (element 522). Otherwise, the storage manager determines whether the selected path is marked as a secondary HI path. If the selected path is marked as a secondary HI path, then the secondary HI path is used (element 526). Otherwise, the storage manager marks this path as a secondary HI path (element 528). It is noted that more than one path can be marked as a secondary HI path, and the HI command can be issued to more than one secondary HI path.

FIG. 5B is a flowchart illustrating a method 550 for the selection of paths when scheduling commands in a storage area network (SAN), according to some embodiments. In one embodiment, method 550 is executed by a storage manager, such as storage manager 112. Method 550 can be performed as part of an implementation of element 404 of FIG. 4, such as in response to a determination (of element 504 of FIG. 5A) that a received command is not an HI command.

In element 552, the storage manager accesses one or more path parameters. The parameters can include a queue count of each path. The queue count indicates how many commands are waiting to be issued on a given path (one example of using such queues is described below with reference to FIG. 6). In some embodiments, the path parameters can include additional and/or different parameters, such as free space available on each storage device that is accessible by a given path, any latency associated with communication over each path, among others.

In element 554, the storage manager determines whether there are any non-HI marked paths available. In some situations, all paths can be marked as some type of HI paths (e.g., as primary, secondary, and/or tertiary HI paths). If there are non-HI paths available (i.e., marked as being available for I/O commands), then element 556 is performed. Otherwise, element 560 is performed.

In element 556, the storage manager determines whether one or more of the path parameters of one or more non-HI paths exceed their respective threshold(s). The storage manager can make this determination based on one or more path parameters. In one implementation, the storage manager examines a queue count for each non-HI marked path, and determines whether the queue count for each respective path exceeds a certain threshold.

For example, with reference to FIG. 2, if path 208(1) is associated with (i.e., marked) a primary HI command, and paths 208(2) and 208(3) are marked as secondary HI command paths, then the storage manager determines whether the path parameter(s) of path 208(4) (the only non-HI marked path in this example) exceed the respective threshold(s). If queue count is used as a path parameter, then the storage manager determines whether the queue count parameter for path 208(4) exceeds a queue count threshold for that path. However, other path parameters can be used, as described above. If the storage manager determines that one or more of the path parameters of one or more non-HI paths (path 208(4) in this example) exceed their respective threshold(s), element 558 is performed. Otherwise, element 560 is performed.

In element 558, the storage manager selects the non-HI marked path(s) based on the path parameter(s). With reference to the example above, the storage manager selects path 208(4) if the path queue (and/or some other path parameter) of path 208(4) does not exceed a certain threshold. It is noted that more than one path can be selected, such as to enable an I/O command to be transmitted using several paths to several controllers. In this case, the storage manager can split up the I/O command, such as to use a first controller to access a first portion of data of a first storage device, and to use a second controller to access a second portion of data of a second storage device.

In element 560, the storage manager determines whether any paths are marked as non-primary HI path(s). In one implementation, the storage manager uses primary and secondary HI paths. In this implementation, the storage manager determines whether there are any paths marked as secondary HI paths (however, in other implementations, tertiary HI paths can also be used). If the storage manager determines that at least one path is marked as a non-primary HI path, element 562 is performed. Otherwise, element 564 is performed.

In element 562, the storage manager selects the primary HI path (as there are no secondary (or tertiary, depending on the implementation) paths available for use). Additionally, once the primary HI path is selected for issuance of a non-HI command, the marking of this path is changed from a primary HI path marking to an I/O command path marking, i.e., to indicate that this path can be used for I/O commands. This determination (of elements 560 and 562) of the HI marked path for use by I/O commands is also referred to as being based on another criteria.

In element 564, the storage manager selects path(s) based on the path parameter(s). The storage manager can select a path (out of all available paths that are not marked as primary HI path(s)) that has a shortest path queue. In other implementations, other path parameters can be used. For example, the storage manager can use a weighting algorithm, where the queue count (i.e., of commands in a path queue) is given 50% of a total score, and other parameters (such as the actual path latency or a percentage of free space of a storage device associated with that path) are given the remainder. The path(s) with the highest path score(s) can then be selected. The selected path(s) can be marked (prior to this selection) as secondary (or tertiary, depending on the implementation) path(s).

Additionally, once paths(s) having secondary (or tertiary, depending on the implementation) markings are selected for issuance of a non-HI command, the marking(s) of these secondary (or tertiary) path(s) are changed from a non-primary HI path marking to an I/O command path marking, i.e., to indicate that this path can be used for I/O commands. This determination of the non-primary HI marked path(s) for use by I/O commands by elements 560 and 564 is also referred to as being based on yet another criteria.

Figure 6:
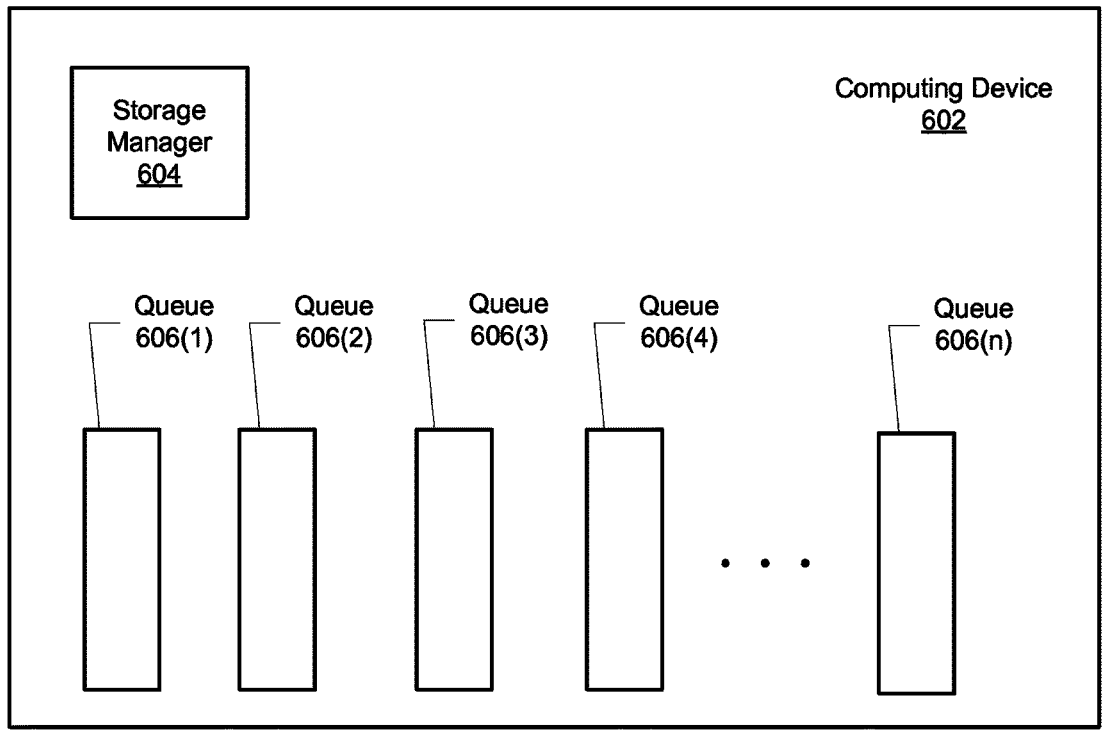
FIG. 6 is a block diagram illustrating various elements of a computing device, according to some embodiments.

FIG. 6 is a block diagram illustrating various elements of a computing device 602, according to some embodiments. Computing device 602 includes a storage manager 604 and queues 606(1)-606(n). Storage manager 604 is designed to implement processes such as methods 400, 500, and 550.

Storage manager 604 is designed to receive, store, and issue commands by using queues 606.

Storage manager 604 can receive various I/O commands, such as from one or more applications 114. Storage manager 604 can also receive HI commands, such as from a system administrator. Storage manager 604 can store these HI commands and I/O commands in each queue. In one embodiment, storage manager 604 determines which of queues 606 to use for storing a received command, such as described by element 404. Additionally, storage manager 604 can store and/or access path parameters, including parameters indicating a number of commands in each of queues 606.

Storage manager 604 can also access, generate, and/or modify marking for each of paths that indicate a certain path as an I/O command, primary HI command, secondary HI command. In some implementations, additional path markings can be used (e.g., a tertiary HI command, etc.). Storage manager 604 also determines which of the queued commands (I/O commands and/or HI commands) are issued to a storage subsystem (e.g., storage subsystem 104). In one implementation, storage manager 604 issues commands from each queue as determined using that queues storing technique (such as FIFO, LIFO, or priority, among others).

In some embodiments, each of queues 606 is associated with a separate path (such as one of paths 204). Each of queues 606 can store commands that are waiting to be issued on each respective path. In some embodiments, queues 606 store either HI commands or I/O commands. The type of commands that each of the queues 606 stores can be determined by the marking of its associated path. For example, if queue 606(1) is associated with a path that is marked as a primary or a secondary HI path, then queue 606(1) stores HI commands (until that path's marking is modified, as described by methods 500 and 550). Similarly, if queue 606(2) is associated with a path that is marked as an I/O command path, then queue 606(2) stores I/O commands (until that path's marking is modified, as described by methods 500 and 550).

In one embodiment, each queue 606 can store both HI commands and I/O commands, and storage manager 604 determines which of the stored commands can be issued. For example, if a queue 606(3) stores a first HI command, a first I/O command, and a second HI command, and queue 606(3) is associated with a secondary HI path marking, then storage manager 604 issues the first and second HI commands without issuing the first I/O command.

Figure 7:
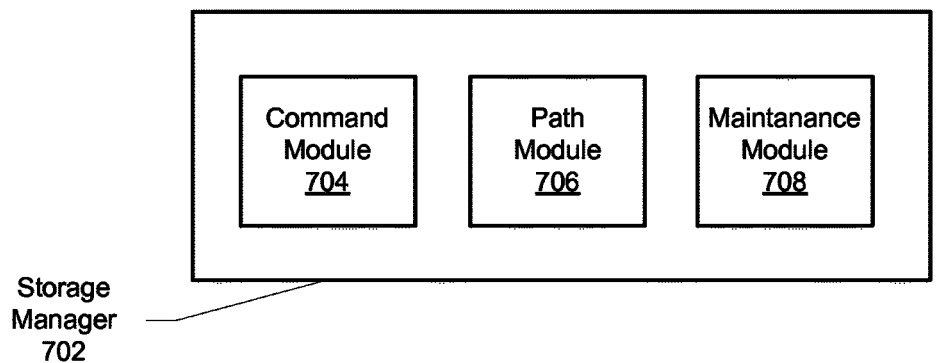
FIG. 7 is a block diagram illustrating various elements of a storage manager, according to some embodiments.

FIG. 7 is a block diagram illustrating various elements of a storage manager 702, according to some embodiments. Storage manager 702 includes a command module 704, a path module 706, and a maintenance module 708. Each of command module 704, path module 706, and/or maintenance module 708 can be implemented using software and/or hardware. As software modules, command module 704, path module 706, and/or maintenance module 708 can be implemented using one or more instructions, and thus are executable by one or more processors (as further described in FIG. 8). As hardware modules, each of command module 704, path module 706, and/or maintenance module 708 can be implemented via an FPGA or other reconfigurable digital logic technology.

Command module 704 is configured to receive and issue commands, including I/O commands and HI commands. As described above, command module 704 can instead receive indications of commands to be issued by application(s) and/or system administrators. Command module 704 is implemented to perform one or more of elements 402 and 406 of method 400. Path module 706 is configured to access path parameter(s) and determine path(s) to be used by each command. Path module 706 is configured to perform element 404 (and associated methods 500 and 550). Maintenance module 708 is configured to perform path maintenance, as described by element 408.

Figure 8:
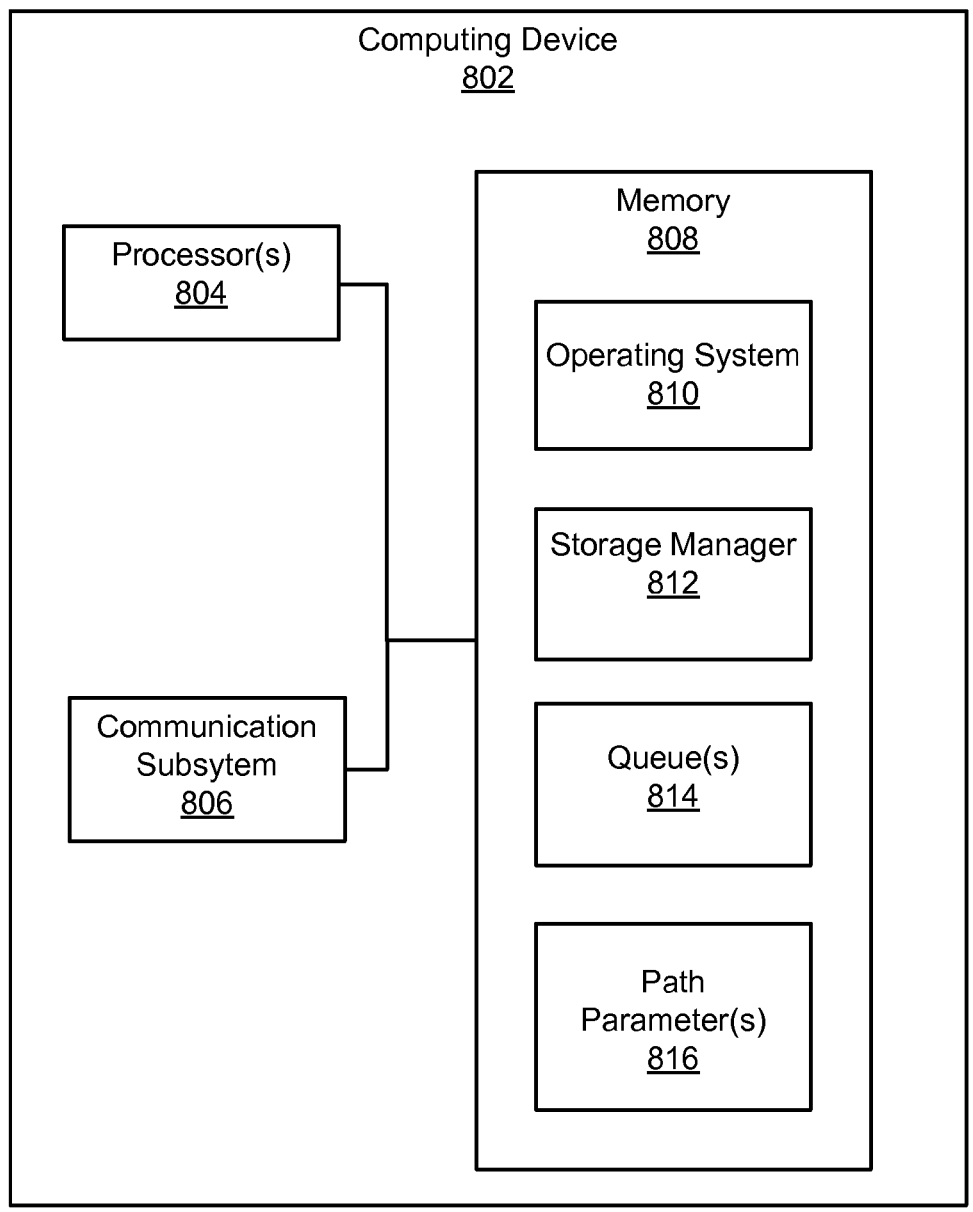
FIG. 8 is a block diagram illustrating an example computing device of a distributed storage system, according to one embodiment.

FIG. 8 is a block diagram illustrating an example computing device 802 of a distributed storage system, according to one embodiment. Computing device 802, which can implement computing device 102 and/or 602, includes a processor 804, communication subsystem 806, and a memory 808. Memory 808 includes an operating system 810, storage manager 812, one or more queues 814, and one or more path parameters 816. It is noted that one or more of element(s) of computing device 802 can be implemented as software, hardware module(s), or some combination thereof. In some embodiments, various elements of computing device 802 can be combined with one another, as desired. It is also noted that, in some embodiments, one or more of elements of computing device 802 may not be used.

Processor(s) 804 executes one or more elements of storage manager 812. Storage manager 812 can implement storage managers 112, 604, and/or 702, and can implement at least portions of methods 400, 500, and/or 550. Queue(s) 814 can implement queues 606. Path parameters 816 can implement path parameters as used by methods 400, 500, and 550.

Example Systems

Figure 9:
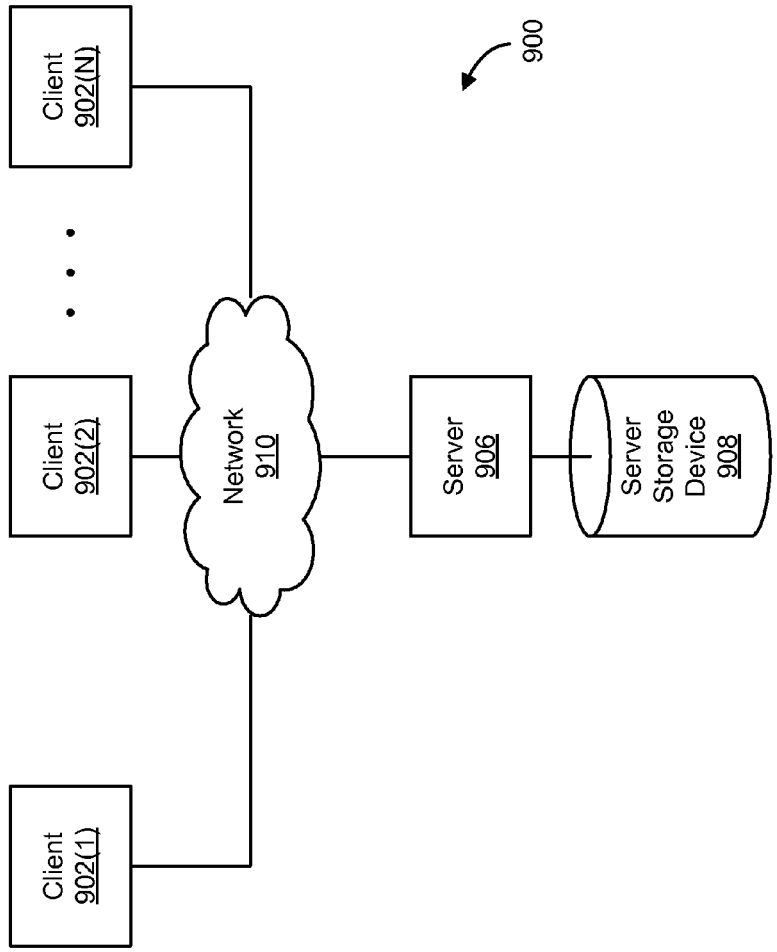
FIG. 9 is a block diagram illustrating a network architecture in which embodiments of the present application can be implemented.

Elements of network architecture can be implemented using different computer systems and networks. An example of one such network environment is described below with reference to FIG. 9. FIG. 9 is a simplified block diagram illustrating a network architecture 900 in which one or more clients are provided with access to a server via various network connections. As depicted in FIG. 9, clients 902(1)-(N) are coupled to a network 910, and so are able to access a server 906 (which can be used to implement the computing device(s) of FIGS. 1, 6, and/or 8) via network 910. Other servers (not shown) can be used instead to implement the computing device(s) of FIGS. 1, 6, and/or 8). A client can be implemented using, for example, a desktop computer, a laptop computer, a workstation, a server, a cell phone, a smart phone, a network-enabled personal digital assistant (PDA), or the like. An example of network 910, which can be used by clients 902(1)-(N) to access server 906, is the Internet. Alternatively, access to server 906 can be provided by a local area network (LAN) utilizing Ethernet, IEEE 802.11x, or some other communications protocol. As will be appreciated, server 906 can be accessed by clients coupled directly thereto (not shown).

As also depicted on FIG. 9, server 906 is coupled to a server storage device 908, which includes a data volume such as can be used by the computing device(s). Server storage device 908 can be implemented as a single storage device or a collection of storage devices. Server storage device 908 can also be implemented as a storage area network, which couples remote storage devices to a server (e.g., server 906), such that the remote storage devices appear as locally-attached storage devices to the server's OS, for example.

In light of the present disclosure, those of skill in the art will appreciate that server storage device 908 can be implemented by any type of computer-readable storage medium, including, but not limited to, internal or external hard disk drives (HDD), optical drives (e.g., CD-R, CD-RW, DVD-R, DVD-RW, and the like), flash memory drives (e.g., USB memory sticks and the like), tape drives and the like. Alternatively, those of skill in the art will also appreciate that, in light of the present disclosure, network architecture 900 can include other components such as routers, firewalls and the like that are not germane to the discussion of the present network and will not be discussed further herein. Those of skill in the art will also appreciate that other configurations are possible. For example, clients 902(1)-(N) can be directly coupled to server storage device 908 without the user of a server or Internet; server 906 can be used to implement both the clients and the server; network architecture 900 can be implemented without the use of clients 902(1)-(N); and so on. As an example implementation of network architecture 900, server 906, services requests to data generated by clients 902(1)-(N) to data stored in server storage device 908. Any of the functionality of the nodes and/or modules can be implemented using one of such clients.

Figure 10:
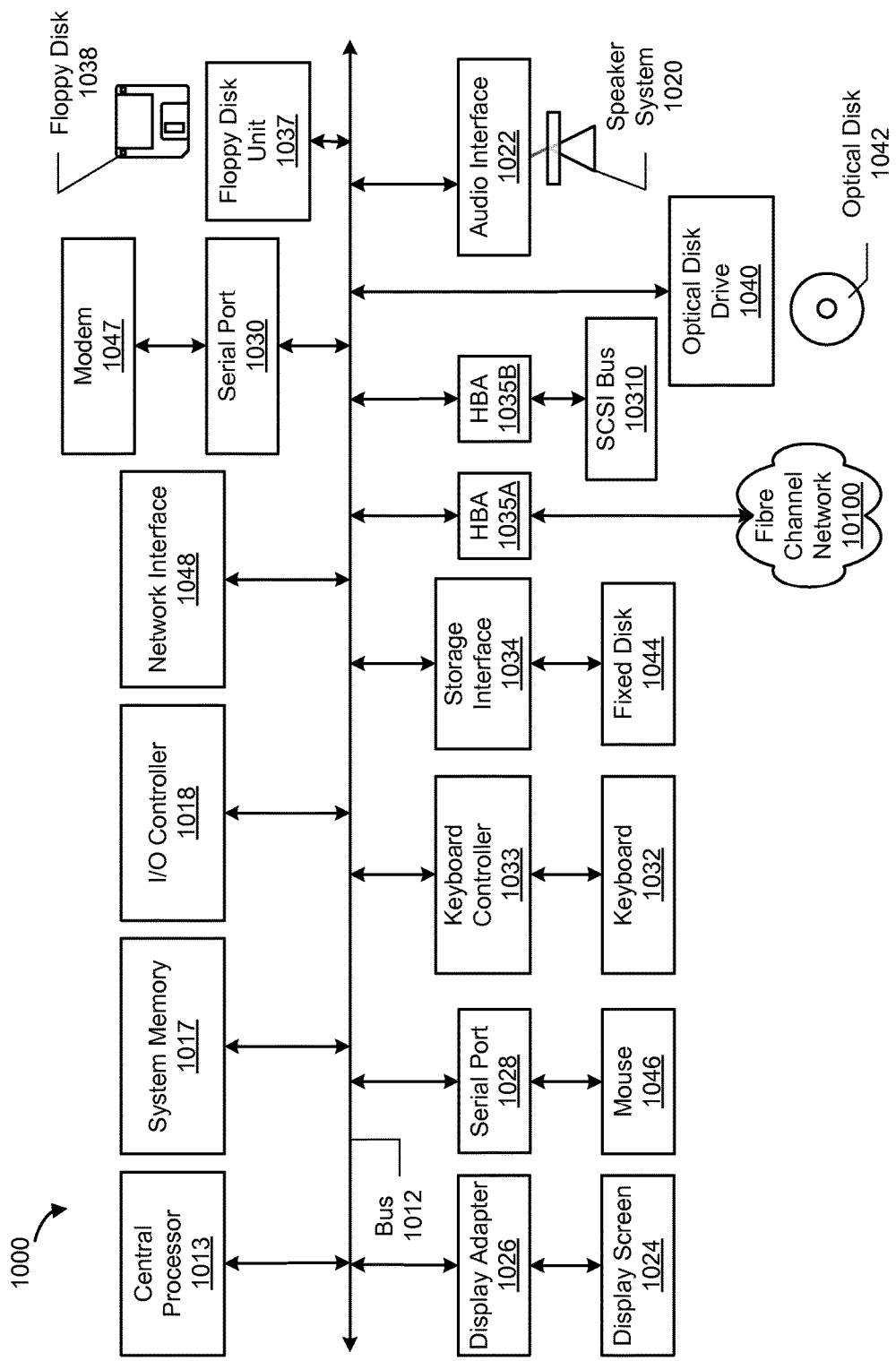
FIG. 10 is a block diagram that illustrates an example of a computer system suitable for implementing embodiments of the present application.

FIG. 10 depicts a block diagram of a computer system 1000 suitable for implementing the present disclosure. Computer system 1000 may be illustrative of various computer systems in the networked system of FIG. 1, such as node(s) and/or coordinator node(s), among others. Computer system 1000 includes a bus 1012 which interconnects major subsystems of computer system 1000, such as a central processor 1013, a system memory 1017 (typically RAM, but which may also include ROM, flash RAM, or the like), an input/output controller 1018, an external audio device, such as a speaker system 1020 via an audio output interface 1022, an external device, such as a display screen 1024 via display adapter 1026, serial ports 1028 and 1030, a keyboard 1032 (interfaced with a keyboard controller 1033), a storage interface 1034, a floppy disk drive 1037 operative to receive a floppy disk 1038, a host bus adapter (HBA) interface card 1035A operative to connect with a Fibre Channel network 1090, a host bus adapter (HBA) interface card 1035B operative to connect to a SCSI bus 1039, and an optical disk drive 1040 operative to receive an optical disk 1042. Also included are a mouse 1046 (or other point-and-click device, coupled to bus 1012 via serial port 1028), a modem 1047 (coupled to bus 1012 via serial port 1030), and a network interface 1048 (coupled directly to bus 1012).

Bus 1012 allows data communication between central processor 1013 and system memory 1017, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 1000 are generally stored on and accessed via a computer readable medium, such as a hard disk drive (e.g., fixed disk 1044), an optical drive (e.g., optical drive 1040), a floppy disk unit 1037, or other storage medium. Additionally, applications can be in the form of electronic signals modulated in accordance with the application and data communication technology when accessed via network modem 1047 or interface 1048.

Storage interface 1034, as with the other storage interfaces of computer system 1000, can connect to a standard computer readable medium for storage and/or retrieval of information, such as a fixed disk drive 1044. Fixed disk drive 1044 may be a part of computer system 1000 or may be separate and accessed through other interface systems. Modem 1047 may provide a direct connection to a remote server via a telephone link or to the Internet via an internet service provider (ISP). Network interface 1048 may provide a direct connection to a remote server via a direct network link to the Internet via a POP (point of presence). Network interface 1048 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 10 need not be present to practice the present disclosure. The devices and subsystems can be interconnected in different ways from that shown in FIG. 10. The operation of a computer system such as that shown in FIG. 10 is readily known in the art and is not discussed in detail in this application. Code for scheduling commands of a storage area network to minimize latency (such as described above with reference to the methods 400, 500, and/or 550), etc., to implement the present disclosure can be stored in computer-readable storage media such as one or more of system memory 1017, fixed disk 1044, optical disk 1042, or floppy disk 1038. Memory 1020 is also used for storing temporary variables or other intermediate information during the execution of instructions by the processor 1013. The operating system provided on computer system 1000 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   receiving a command, wherein
      the command is received prior to an issuance of the command to one or more storage devices, and
      the command is configured to be issued to the one or more storage devices using one or more paths of a plurality of paths;
   determining whether the command is a high impact (HI) command, wherein
      the HI command is configured to make at least one of the one or more paths unavailable for a separate input/output (I/O) command, and
      the determining is based on a command type criteria associated with the command;
   in response to a determination that the command is an HI command, selecting a first path of the plurality of paths as a primary HI path, wherein
      the selecting comprises determining which path of the plurality of paths has a lowest number of queued commands among the plurality of paths; and
   using the first path to issue the HI command, wherein
      the first path is not used to issue any separate I/O commands until the HI command has been completely performed.

2. The method of claim 1, further comprising:
   receiving another command, wherein
      the another command is received prior to an issuance of the another command to the one or more storage devices;
   determining whether the another command is an HI command, wherein
      the determining whether the another command is an HI command is based, at least in part, on a second criteria, wherein
         the second criteria comprises information associated with the command, and
         the second criteria indicates whether the command is one of a pre-determined set of HI commands;
   in response to a determination that the another command is an HI command,
      selecting another path of the plurality of paths as a secondary HI path, wherein
         the secondary HI path is available to non-HI commands based on a third criteria,
         the third criteria indicates that remaining paths of the plurality of paths are not available for command issuance, and
      issuing the another command using the secondary HI path.

3. The method of claim 2, wherein
   the remaining paths comprise paths of the plurality of paths not selected as the primary HI path of the secondary HI paths, and
   the second criteria further indicates that
      a number of queued commands for each of the remaining paths exceeds a respective threshold.

4. The method of claim 2, further comprising:
   in response to a determination that the another command is not an HI command,
      determining whether one of the remaining paths is available; and
   in response to a determination that one of the remaining paths is available,
      selecting one of the remaining paths, and
      issuing the another command using one of the remaining paths.

5. The method of claim 4, further comprising:
   in response to a determination that one of the remaining paths is not available,
      determining whether the one or more paths meet the second criteria,
   in response to a determination that the second criteria is met,
      selecting the secondary HI path, and
      issuing the another command using the secondary HI path.

6. The method of claim 2, wherein
the command and the another command are comprised in a large HI command.

7. The method of claim 1, wherein
the command is a command of a protocol used by a storage area network (SAN),
the one or more paths are implemented using the SAN, and
the SAN comprises one of
a small computer system interface (SCSI) network, or
a fibre channel network.

8. The method of claim 1, wherein
the command is determined to be an HI command if the command type criteria indicates that the command is at least one of the following command types:
a reclaim command,
a writesame command,
a trim command,
a map command, or
an unmap command.

9. The method of claim 1, wherein
a non-HI command comprises
a data write command, wherein
the data write command is configured to write data to the one or more storage devices, or
a data read command, wherein
the data read command is configured to read data from the one or more storage devices.

10. The method of claim 2, further comprising:
issuing the command using the primary HI path, wherein
execution of the command is configured to perform a high impact operation on the one or more storage devices.

11. The method of claim 1, wherein
a first node and a second node are configured to operate on data stored by the one or more storage devices using the first path.

12. The method of claim 1, wherein
each HI command of a pre-determined set of HI commands utilizes high amounts of bandwidth, relative to I/O commands.

13. The method of claim 1, wherein
issuance of an HI command prevents a path of the plurality of paths from being used to issue I/O commands.

14. The method of claim 1, wherein
evaluating the command type criteria comprises comparing respective path parameter values for the plurality of paths,
the respective path parameter values indicate respective queue counts associated with each of the plurality of paths,
a minimum queue count is selected based on the comparing, and
the minimum queue count indicates how many commands are waiting to be issued on the first path.

15. The method of claim 1, wherein
evaluating a second criteria comprises comparing respective path parameter values for a plurality of non-HI paths of the plurality of paths to determine whether a maximum queue count exceeds a pre-determined threshold.

16. A system comprising:
one or more processors;
a storage manager configured to
receive a command, wherein
the command is received prior to an issuance of the command to one or more storage devices, and
the command is configured to be issued to the one or more storage devices using one or more paths;
determine whether the command is a high impact (HI) command, wherein
the HI command is configured to make at least one of the one or more paths unavailable for a separate input/output (I/O) command, and
determining whether the command is an HI command is based on a command type criteria associated with the command;
in response to a determination that the command is an HI command, select a first path of the one or more paths as a primary HI path, wherein
the storage manager is configured to select the first path by determining which path of the one or more paths has a lowest number of queued commands among the one or more paths; and
use the first path to issue the HI command, wherein
the first path is not used to issue any separate I/O commands until the HI command has been completely performed.

17. The system of claim 16, wherein the storage manager is further configured to:
receive another command, wherein
the another command is received prior to an issuance of the another command to the one or more storage devices;
determine whether the another command is an HI command, wherein
the storage manager is configured to determine whether the another command is an HI command based, at least in part, on a second criteria, wherein
the second criteria comprises information associated with the command, and
the second criteria indicates whether the command is one of a pre-determined set of HI commands;
in response to a determination that the another command is an HI command,
select another path of the plurality of paths as a secondary HI path, wherein
the secondary HI path is available to non-HI commands based on a third criteria,
the third criteria indicates that remaining paths of the plurality of paths are not available for command issuance, and
issue the another command using the secondary HI path.

18. The system of claim 17, wherein
the remaining paths comprise paths of the plurality of paths not selected as the primary HI path of the secondary HI paths, and
the second criteria further indicates that
a number of queued commands for each of the remaining paths exceeds a respective threshold.

19. The system of claim 17, wherein the storage manager is further configured to:
in response to a determination that the another command is not an HI command,
determine whether one of the remaining paths is available; and
in response to a determination that one of the remaining paths is available,
select one of the remaining paths, and
issue the another command using one of the remaining paths.

20. A computer program product comprising:
a plurality of instructions, comprising
- a first set of instructions, executable on a computer system, configured to receive a command, wherein
  - the command is received prior to an issuance of the command to one or more storage devices, and
  - the command is configured to be issued to the one or more storage devices using one or more paths,
- a second set of instructions, executable on the computer system, configured to determine whether the command is a high impact (HI) command, wherein
  - the HI command is configured to make at least one of the one or more paths unavailable for a separate input/output (I/O) command, and
  - determining whether the command is an HI command is based on a command type criteria associated with the command,
- a third set of instructions, executable on the computer system, configured to select a first path of the one or more paths as a primary HI path, wherein
  - selecting the first path comprises determining a path of the one or more paths that has a lowest number of queued commands, and
- a fourth set of instructions, executable on the computer system, configured to use the first path to issue the HI command, wherein
  - the first path is not used to issue any separate I/O commands until the HI command has been completely performed; and
- a non-transitory computer-readable storage medium, wherein the instructions are encoded in the non-transitory computer-readable storage medium.

21. The computer program product of claim 20, wherein the plurality of instructions further comprise:
- a fifth set of instructions, executable on the computer system, configured to
  - receive another command, wherein
    - the another command is received prior to an issuance of the another command to the one or more storage devices,
- a sixth set of instructions, executable on the computer system, configured to
  - determine whether the another command is an HI command, wherein
    - the determining whether the another command is an HI command is based, at least in part, on a second criteria, wherein
      - the second criteria comprises information associated with the command, and
      - the second criteria indicates whether the command is one of a pre-determined set of HI commands,
- a seventh set of instructions, executable on the computer system, configured to
  - in response to a determination that the another command is an HI command,
    - select another path of the one or more paths as a secondary HI path, wherein
      - the secondary HI path is available to non-HI commands based on a third criteria,
      - the third criteria indicates that remaining paths of the one or more paths are not available for command issuance, and
- a eighth set of instructions, executable on the computer system, configured to
  - issue the another command using the secondary HI path.

22. The computer program product of claim 20, wherein
the remaining paths comprise paths of the one or more paths not selected as the primary HI path, and
the second criteria further indicates that
  a number of queued commands for each of the remaining paths exceeds a respective threshold.

23. The computer program product of claim 20, wherein the plurality of instructions further comprise:
- a fifth set of instructions, executable on the computer system, configured to
  - in response to a determination that the another command is not an HI command,
    - determine whether one of the remaining paths is available, and
- a sixth set of instructions, executable on the computer system, configured to
  - in response to a determination that one of the remaining paths is available,
    - select one of the remaining paths, and
    - issue the another command using one of the remaining paths.

* * * * *